(12) United States Patent
Knaebel

(10) Patent No.: US 6,543,112 B1
(45) Date of Patent: Apr. 8, 2003

(54) TIRE VALVE TOOL

(76) Inventor: Kelly R. Knaebel, 7121 North St., Newburgh, IN (US) 47630

( * ) Notice: Subject to any disclaimer, the term of this patent is extended or adjusted under 35 U.S.C. 154(b) by 0 days.

(21) Appl. No.: 09/683,389

(22) Filed: Dec. 20, 2001

(51) Int. Cl.$^7$ ................................................. B23P 19/04
(52) U.S. Cl. ........................................ 29/221.5; 29/267
(58) Field of Search .......................... 29/221.5, 213.1, 29/235, 240, 222.5, 267, 264; 254/50.4, 50.1, 131; 81/15.2

(56) References Cited

U.S. PATENT DOCUMENTS

| | | | | |
|---|---|---|---|---|
| 3,769,683 A | * | 11/1973 | Krekeler | 29/221.5 |
| 3,928,902 A | * | 12/1975 | Seims et al. | 29/221.5 |
| 4,528,735 A | * | 7/1985 | Eastridge et al. | 29/221.5 |
| 6,035,885 A | * | 3/2000 | Schuessler, Jr. et al. | 29/221.5 |

* cited by examiner

Primary Examiner—Lee Wilson
(74) Attorney, Agent, or Firm—Eric R. Wandel

(57) ABSTRACT

The present invention is a tire valve tool for use in servicing valve stems in tubeless pneumatic tire rims. The tool may be used to install a valve stem into a tire rim and may also be used to extract a valve stem from the tire rim. The tool includes a clamping jaw assembly at one end of an elongated handle. A lever arm attached to one of the clamping jaws serves to provide both a fulcrum point for accomplishing a mechanical advantage in pulling on the valve stem and as a lever for applying a closing force to the jaw assembly in order to grip the valve stem. The clamping jaw assembly is shaped so that valve stems in rims with recessed valve stem openings can be grasped below the main rim surface without causing damage to the rim surface. The tool preferably incorporates a non-marring material for the fulcrum end of the lever in order to minimize damage to the rim surface.

14 Claims, 5 Drawing Sheets

TIRE VALVE TOOL

BACKGROUND OF INVENTION

The present invention relates generally to tire valve stem tools for installation or removal of rubber valve stems from tubeless type pneumatic tire rims. Tire valve stem tools may find use in a service garage where tires are dismounted from wheels for replacement or repair, and the valve stems are removed or replaced. Tire valve stem tools also are used to facilitate installation of a valve stem in a rim prior to mounting new tires.

Valves for tubeless pneumatic tires are typically installed in a wheel rim by pulling the valve through a mounting hole until the base of the valve is seated against the inside rim surface adjacent the valve opening of the rim. The usual method of removing the valve stem assembly for tire servicing is to pull the valve completely through the mounting hole. Some force is required both to install the valve stem and to remove the valve stem, so tools have been adapted for grasping the valve stem and for providing increased leverage for pulling.

The tools used in tire service shops include a variety of methods for attaching to or gripping the valve stem, and also include a variety of methods for providing some amount of mechanical advantage when pulling the valve stem through the opening in the rim.

One device that has been used for installing and removing valve stems from tubeless pneumatic tire rims is described in U.S. Pat. No. 1,308,219 as including a tool that connects to the valve stem with a threaded cap member adapted for screwing onto the threaded tip of the valve stem. A chain or cable has the threaded cap attached at one end with a handle attached at the other end. As originally used this tool was intended to hold the valve stem of a tire inner tube in place while the outer tire was positioned and the tube was inflated. The use of this tool for tubeless tire valve stem installation and removal was a natural evolution, but the design did not include mechanical advantage. This tool is used for valve stem installation by simply inserting the valve stem from the inside of the rim, attaching the treaded cap to the valve stem and pulling the handle until the valve is seated in the opening in the rim. The valve stem is similarly removed by simply pulling on the handle until the valve is forcibly extracted through the valve opening. As stated, this tool provides no mechanical increase in the applied force.

There are several other devices with elongated handles designed to provide mechanical advantage in the process of installing and removing valve stems from tubeless tire rims. The most common of these devices used in service garages today are described in U.S. Pat. Nos. 3,562,891 and 2,940,167. These devices provide for a means of attachment to the valve stem at one end of the handle and a method of prying the valve stem into or from the rim opening.

The devices described in U.S. Pat. Nos. 3,562,891 and 2,940,167 were preferably used on steel wheels. One problem with their use on custom wheels that may be made of steel, aluminum, chromed or other finished surface is that damage to the surface in the form of scratches or dents can be caused where the tool makes contact with the rim. It is preferable to prevent damage to the finished surface of the rim, which may be soft or highly polished.

Another problem encountered with the existing tools is that they are designed to grasp a valve stem that protrudes through the rim opening and above the surface of the rim. However, many modern rims are designed with recessed holes for the valve stem so that the valve stem does not protrude appreciably above the rim surface. These recessed valve stem holes make it difficult or impossible to either be grasped by the previous devices or to be operated on by the previous devices without causing damage to the rim surface.

One known practice for installing or removing valve stems in recessed valve openings makes use of a device similar to that described by U.S. Pat. No. 2,940,167, that consists of a threaded cap pivotally attached to an elongated handle.

One method that has been used to insert a valve stem in a recessed valve opening involves first inserting the valve stem into the valve opening from inside the rim. The threaded cap of the previously described tool is screwed onto the valve stem. A rag or other protective cushioning material is placed between the tool handle and the rim surface, and the valve stem is then pried into a seated position. Great care must be taken to avoid damage to the rim surface near the valve stem opening. For some rims, it is not even possible to apply a prying force because the rim shape blocks the movement of the handle.

To remove a valve stem from a recessed valve stem opening, one procedure is to first remove the valve core, which allows the tire to deflate, then the tire is removed from the rim, and finally the valve stem is cut from the back side of the rim to remove the valve stem from the rim. This process is more time consuming and more difficult than if the valve stem could be safely grasped with a tool for installation and removal without risk of damage to the rim.

SUMMARY OF INVENTION

The present invention is designed to improve upon the previous tools so that valve stems used in modern rims can be serviced easily. In one embodiment, a single-handed operation is possible without damaging the rim surface.

One embodiment of the present invention is a tire valve stem tool for tubeless tire rims that comprises an elongated handle extending between a proximal end and a distal end. The tool further includes a means for grasping a valve stem, the grasping means being attached to the distal end of the handle. The tool also includes a lever arm extending between an attached end and a fulcrum end. The attached end of the lever arm is attached to the distal end of the handle.

Another embodiment of the present invention is a tire valve stem tool that comprises an elongated handle extending between a proximal end and a distal end.

The tool further comprises a first clamping jaw member extending between a first clamping jaw attached end and a first clamping jaw grasping end. The first clamping jaw attached end is fixedly attached to the distal end of the handle and extends substantially lineally from the distal end of the handle. The tool further comprises a second clamping jaw member extending between a second clamping jaw attached end and a second clamping jaw grasping end. The second clamping jaw attached end is pivotally attached to the distal end of the handle at a pivot point substantially adjacent the first clamping jaw member. The second clamping jaw member pivots between a closed position and an open position in relation to the first clamping jaw member. The tool further comprises a lever arm fixedly attached to the second clamping jaw member and at a substantially normal angle to the second clamping jaw member. The lever arm also has a fulcrum end extending beyond the pivot point past the first clamping jaw member.

Another embodiment of the present invention is a tire valve stem tool that comprises an elongated handle extending between a proximal end and a distal end. The tool further comprises a first clamping jaw member extending between a first clamping jaw attached end and a first clamping jaw grasping end. The first clamping jaw attached end is fixedly attached and extends substantially lineally from the distal end of the handle. The tool further comprises a second clamping jaw member extending between a second clamping jaw attached end and a second clamping jaw grasping end. The second clamping jaw attached end is pivotally attached to the distal end of the handle at a pivot point substantially adjacent the first clamping jaw member. The second clamping jaw member pivots between a closed position and an open position in relation to the first clamping jaw member. The tool further comprises a lever arm extending between a lever arm attached end and a fulcrum end, wherein the length of the lever arm is between substantially one inch and substantially six inches. The lever arm attached end is fixedly attached and at a substantially normal angle to the second clamping jaw member and the lever arm fulcrum end extends beyond the pivot point past the first clamping jaw member. The fulcrum end of the lever arm has a bottom side that is in the direction of the first and second clamping jaw members. The tool further comprises a contact surface attached to the bottom side of the fulcrum end, and the contact surface is made of a polymer material.

These and other objects of the invention will be made apparent through the detailed description and through references to the drawings.

DETAILED DESCRIPTION

Figure 1A:
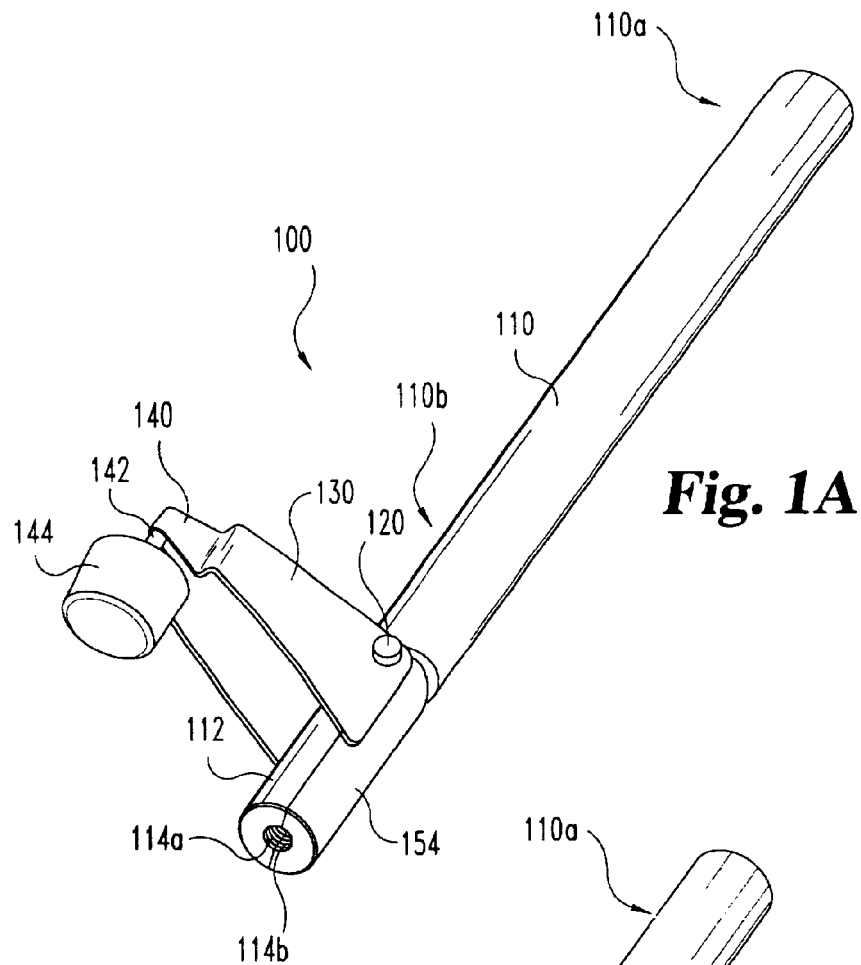
FIG. 1A and FIG. 1B are perspective views of the tire valve tool in the closed and open positions, respectively.

Referring to the drawings, one preferred embodiment of the subject invention will now be discussed. The valve stem tool, indicated generally by reference numeral 100, includes an elongated handle 110 with a proximal end 110a and a distal end 110b and having a first clamping jaw member 112 fixedly attached and extending lineally at the distal end of the handle. It should be understood that the first clamping jaw member 112 may also be machined or formed as an integral portion of the handle 110.

Figure 1B:
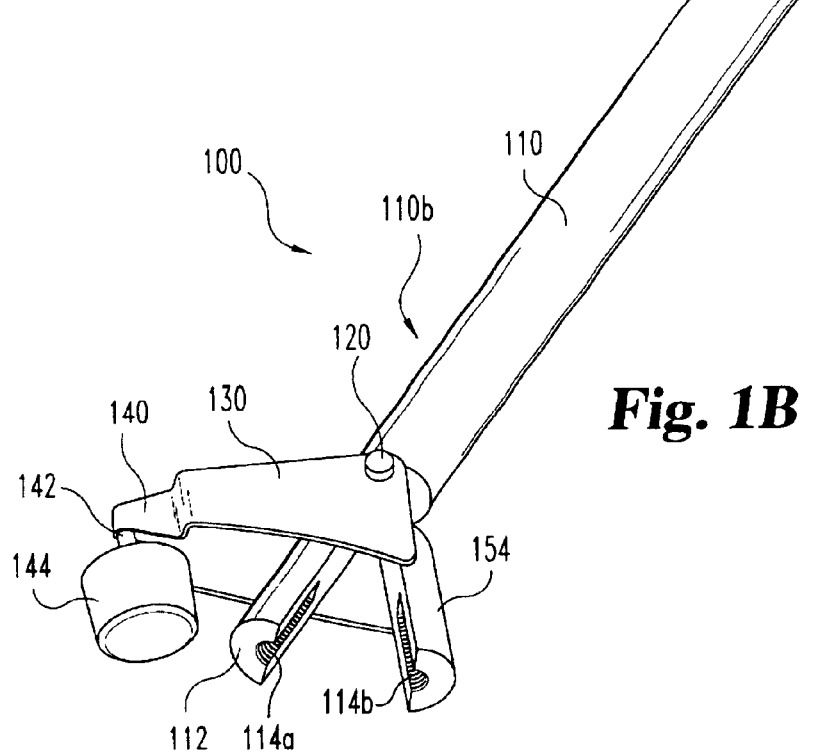
Figure 5A:
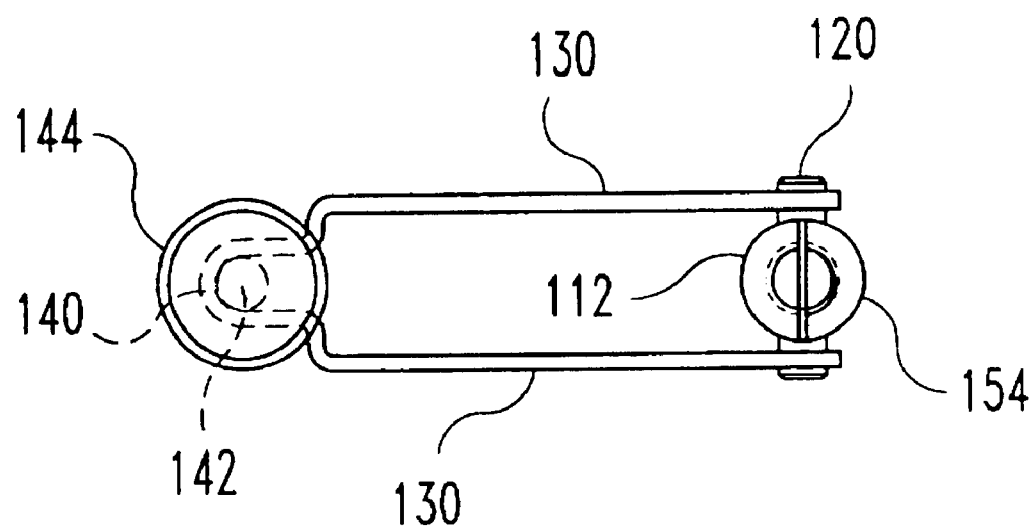
FIG. 5A and FIG. 5B are end views of the tire valve tool in the closed and open positions, respectively, as viewed from the clamping jaw end.
Figure 5B:
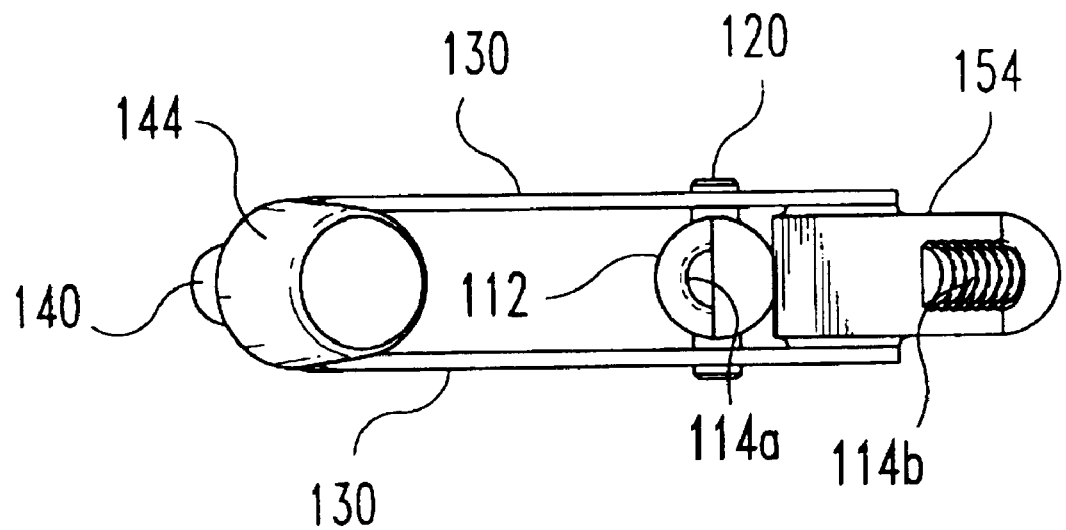
Figure 6A:
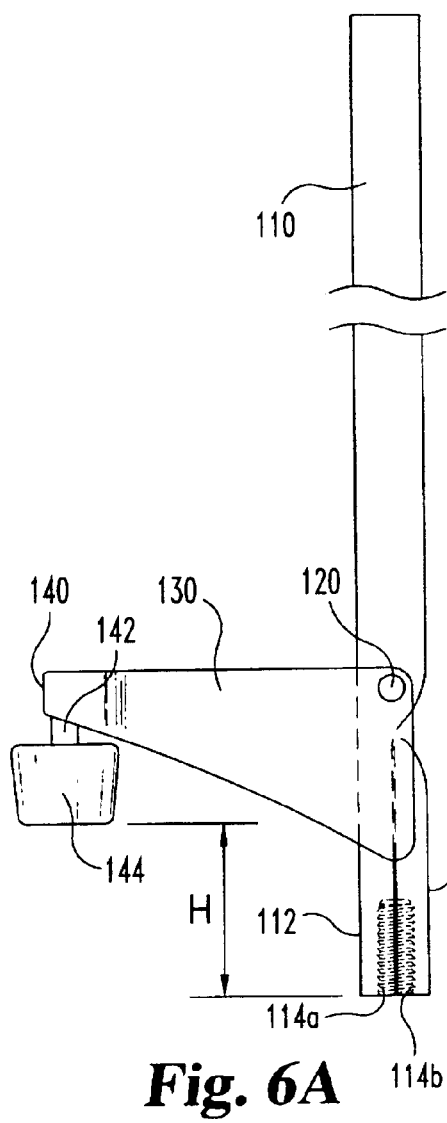
FIG. 6A and FIG. 6B are side views of the tire valve tool in the closed and open positions, respectivey.
Figure 6B:
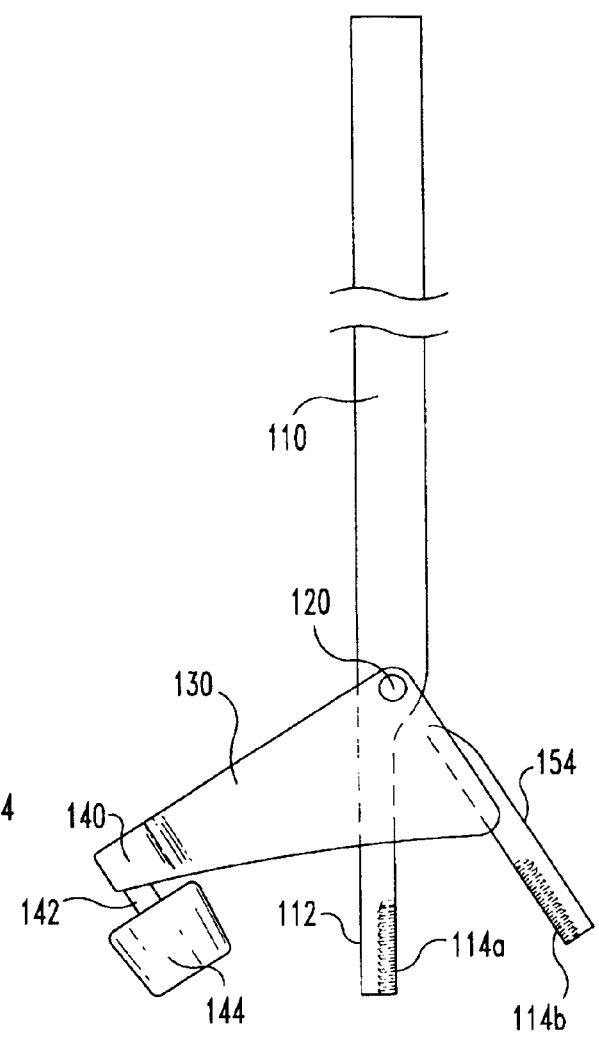

A pivot point 120 is located at the distal end of the handle where the handle 110 and the first clamping jaw member 112 connect. A second clamping jaw member 154 is pivotally attached at the pivot point 120 and is in pivotal relation to the first clamping jaw member 112 so that the second clamping jaw member 154 is pivot between a closed position with the first clamping jaw member 112, as illustrated in FIGS. 1A, 5A and 6A, and an open position relative to the first clamping jaw member 112 as illustrated in FIGS. 1B, 5B and 6B. The clamping jaws 112 and 154 extend beyond the distal end of the handle to facilitate grasping valve stems in recessed valve stem openings as described herein.

Figure 4:
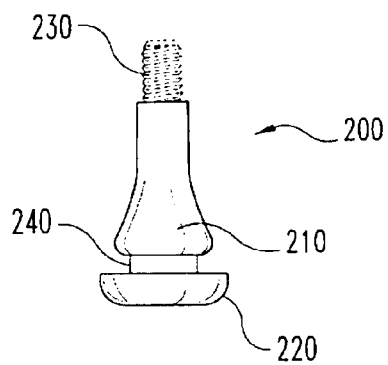
FIG. 4 is an illustrative side view of a valve stem.

The grasping ends of clamping jaws 112 and 154 are defined as the ends opposite the attachment point at the distal end 110b of the handle 110 and are preferably formed to grasp a valve stem 200 (see FIG. 4). In one embodiment of the grasping end design illustrated in FIG. 1B, the inner surfaces of the clamping jaws preferably define grooves 114a and 114b along an inner radius of the clamping jaws. These grooves 114a and 114b enhance gripping of the body 210 or threaded tip 230 of a typical valve stem 200.

A lever arm 130 is preferably fixedly attached at a substantially normal angle to the second clamping jaw member 154. The lever arm 130 is therefore able to pivot with the second clamping jaw 154 about the pivot point 120. Note that since the lever arm 130 and the second clamping jaw member 154 are fixedly attached to each other, the pivot connection could be made to either the second clamping jaw 154 or to the lever arm 130. It should be understood that either of these described alternatives are contemplated as within the scope of the invention as are other connection variations that would occur to those of ordinary skill in the art.

The range of movement of the combined second clamping jaw 154 and the lever arm 130 is such that the lever arm pivots from essentially a normal angle to the handle 110 when the clamping jaws are in the closed position as illustrated by FIGS. 1A, 5A and 6A, to a position closer the tip of the first clamping jaw member 112 when the clamping jaws are in an open position as illustrated in FIGS. 1B, 5B and 6B. It is only necessary for the second clamping jaw 154 to pivot to an open position that is wide enough for a valve stem to fit between the clamping jaws prior to being grasped.

The lever arm 130, being preferably fixedly attached to the second clamping jaw member 154, extends beyond the first clamping jaw member 112 as illustrated in the figures to the side opposite the second clamping jaw member 154. One embodiment of the lever arm 130 is illustrated in FIGS. 1A and 1B, where the lever arm 130 extends with two opposing members around the first clamping jaw member 112 to a fulcrum end 140. The length of the lever arm 130 is preferably between substantially one inch to substantially six inches. It should be understood that a variety of lever arm lengths as well as other variations of the construction of the lever arm that would occur to those of ordinary skill in the art are contemplated as within the scope of the invention.

The bottom side of the fulcrum end is defined as the side of the fulcrum end from which the contact surface 144 extends and is also the side of the fulcrum arm in the direction of the clamping jaws 112 and 154 as shown in FIGS. 1A and 1B. A contact surface 144 can be attached to the bottom side of the fulcrum end 140 of lever arm 130. The contact surface 144 is preferably made of a non-marring material, such as rubber or a polymer, in order to protect the surface finish of a wheel rim 300 when the tool is used to install or remove a valve stem.

The contact surface 144 can be attached to the fulcrum end 140 either directly or with an extension piece 142 that can be adapted for adjusting the offset height H (see FIG. 6A) of the contact surface 144 in relation to the grasping end of the clamping jaws 112 and 154. The offset height H of the contact surface 144 in relation to the grasping end of the clamping jaws may also be varied by changing the angle or shape of manufacture of the lever arm. The offset height H is preferably between zero to four inches. One embodiment of the invention uses an attached contact surface 144 that has a fixed offset height H.

One method of attaching the contact surface 144 to the lever arm 130, as illustrated in the figures, uses an extension piece 142 connected at one end to the fulcrum end 140 of the lever arm 130 and at the other end to the contact surface 144. It should be understood that a wide variety of alternative connections between the contact surface 144 to the lever arm 130 are contemplated as within the scope of the invention. For example, another form of the lever arm assembly includes using a construction where the lever arm and the contact surface are directly connected to each other without the use of an extension piece. Also, the entire assembly of the lever arm and contact surface could be formed as a single construction, for instance as a single molded part.

Figure 3A:
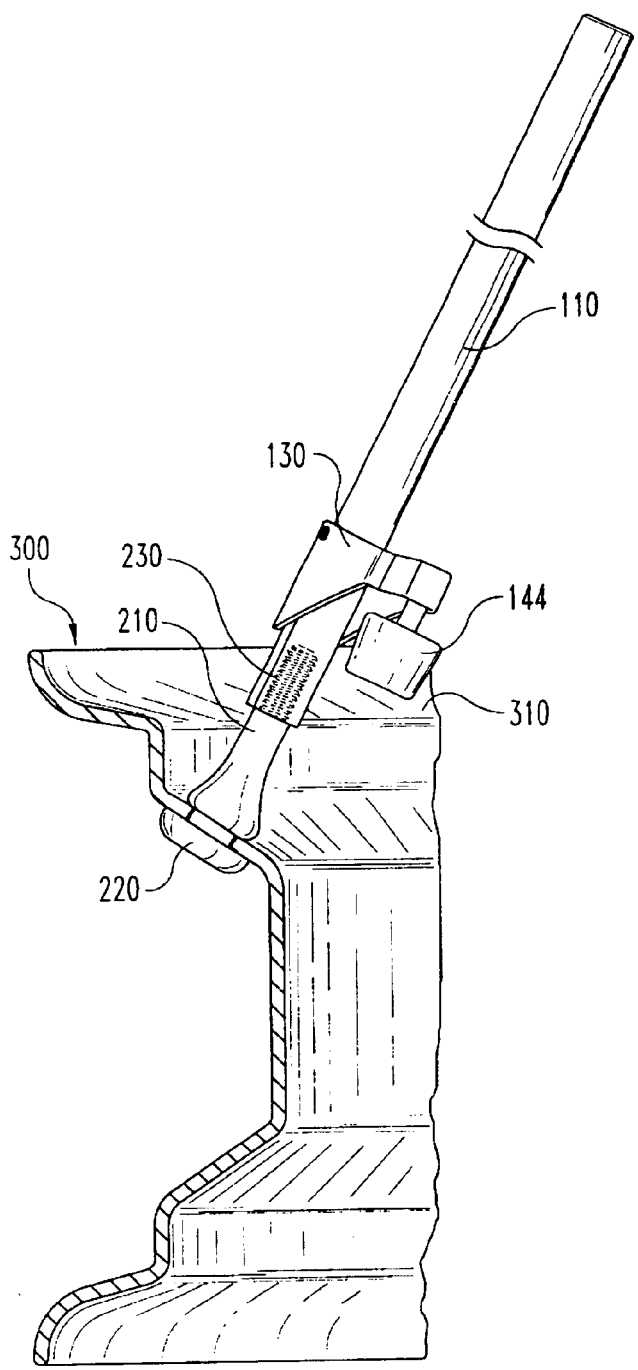
FIG. 3A is a cross section view of the tire valve tool as it would typically be positioned in relation to the valve stem and the tire rim for a rim where the valve stem protrudes above the surface of the rim.

A typical valve stem 200 is illustrated in FIG. 4. The valve stem body 210 is typically a rubber material and is designed to extend through the opening of a tire rim 300 as illustrated in FIG. 3A. The valve stem body 210 extends to a threaded tip 230 at the top. At the bottom of the valve stem is an expanded base 220 that is designed to seat against the back of the rim opening when the valve stem 200 is properly installed in a tire rim 300. A notched neck 240 is formed between the valve body 210 and the base 220.

Figure 2:
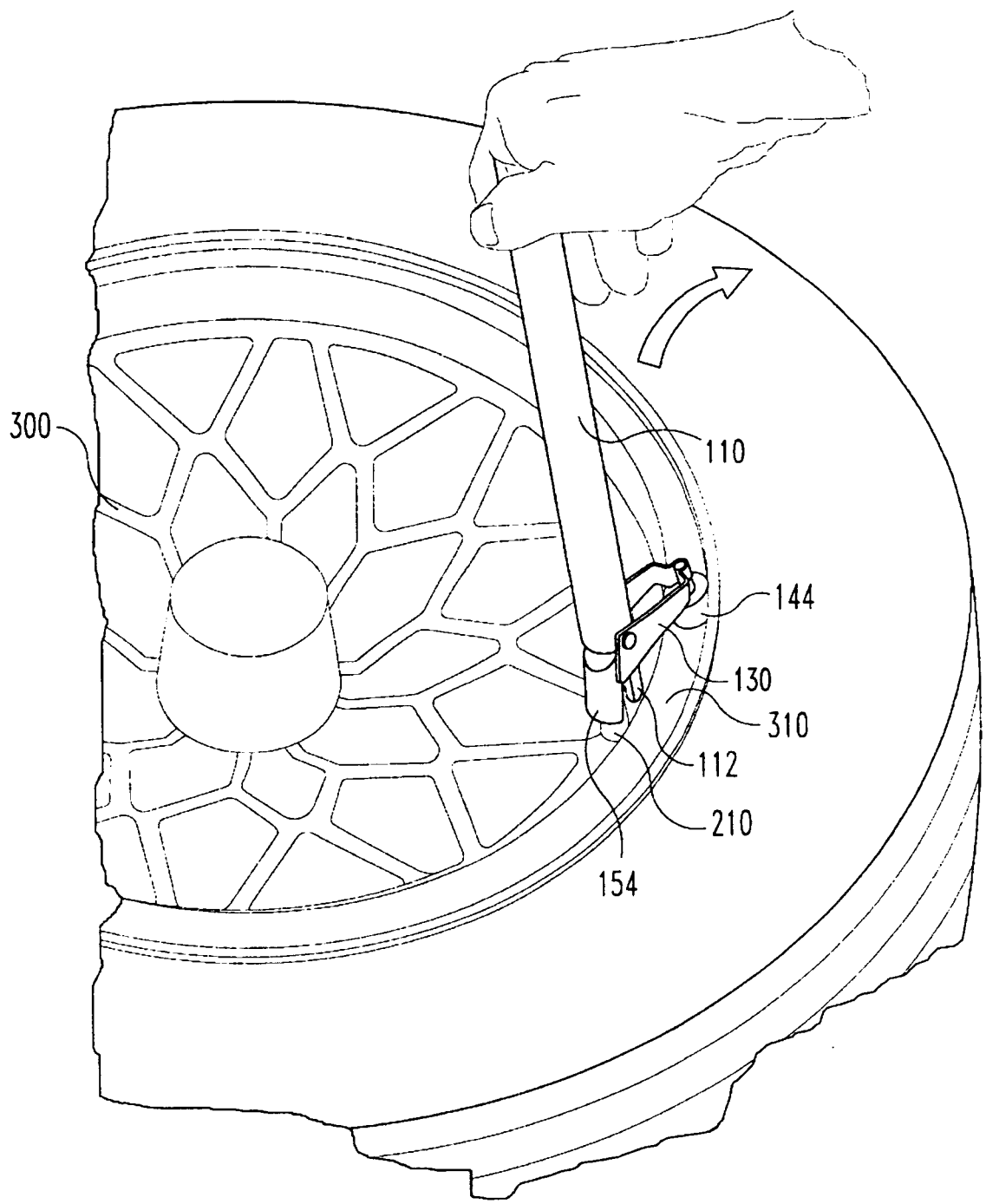
FIG. 2 is a perspective view of the tire valve tool as it would typically be used, showing the typical relationship between the tool, the valve stem and the tire rim.

The valve stem tool 100 is operated by first positioning the clamping jaws 112 and 154 around a valve stem, then positioning the contact surface 144 in contact with the rim surface near the valve stem opening in the rim, and then pivoting the handle 110 about the fulcrum end 140 of the lever arm 130 and in the direction of the lever arm 130 as indicated by the direction arrow in FIG. 2.

One method of utilizing the valve stem tool 100 is illustrated in FIGS. 2 and 3A. The operations described herein can be applied for either the process of installing a valve stem or the process of removing a valve stem.

As illustrated in FIG. 2, the clamping jaws 112 and 154 are preferably placed around the body 210 of the valve stem 200. The contact surface 144 is positioned on the wheel rim 300 at a surface 310 adjacent to the valve stem position. The handle 110 is pivoted about the pivot point 120 in the direction of the lever arm 130 and contact surface 144 as indicated by the direction arrow in FIG. 2 to cause the first clamping jaw member 112 to close against the valve stem 200 and to compress the valve stem against the second clamping jaw member 154. When the clamping jaws begin to compress against the valve stem, continued movement of the handle 110 in the direction of the lever arm 130 results in the handle, the clamping jaws and the valve stem that is grasped between the clamping jaws to rotate about the fulcrum end 140 of the lever arm 130. With the valve stem now clamped between the clamping jaws, the continued pressure on the handle 110 in the direction of the lever arm 130 results in the force on the handle being transferred to an upward pulling force on the valve stem. The upward pulling force results in the valve stem being pulled through the rim opening.

It should be understood by those of skill in the art that the operation just described could be conducted either on a valve stem that is seated in a rim and is desirably removed from the rim or on a valve stem that is inserted from the back of the rim and is desirably installed in the rim by seating the valve stem in the rim. When inserting a valve stem, the prying force is halted when the valve stem base 220 seats against the back of the rim. When a valve stem is to be removed from a rim, the operator continues to apply force to the handle until the valve stem is pulled completely through the valve stem opening in the rim.

Figure 3B:
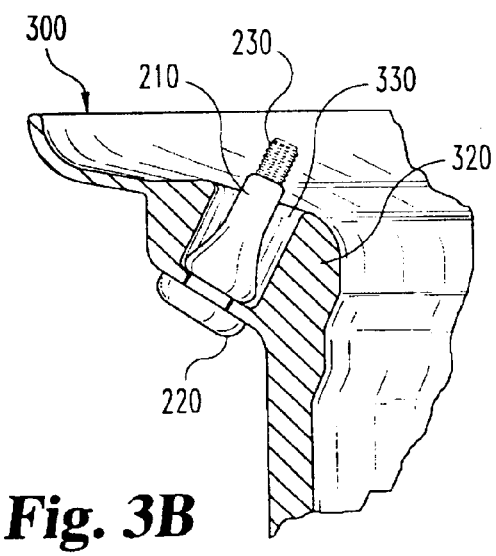
FIG. 3B shows a cross section view of a valve stem in a recessed opening.

An example of a recessed valve stem opening is illustrated in FIG. 3B. In FIG. 3B, one style of rim is illustrated with a representative styled shape that has a solid cross-section 320 as illustrated. This example of styled rim is one example illustrating the recessed opening for the valve stem that is designed for housing the valve stem. In other typical rim styles, the recessed opening may simply be a part of the rim design that has been adapted for incorporating the valve stem opening. It should be understood by those of skill in the art that the present invention is effective on a wide variety of alternative rim styles that exist and that the style shown in FIG. 3B is meant only to be illustrative of a typical recessed valve stem opening.

In FIG. 3B, the valve stem body 210 is substantially below the surface of the rim in the recessed opening 330. The clamping jaws 112 and 154 of the valve stem tool 100 preferably fit into the recessed opening 330 and grasp the valve stem body 210. The contact surface 144 at the fulcrum end of the lever arm 130 preferably remains above the surface of the rim in order to act as the fulcrum point when force is applied to the handle 110 as previously described.

Figure 7:
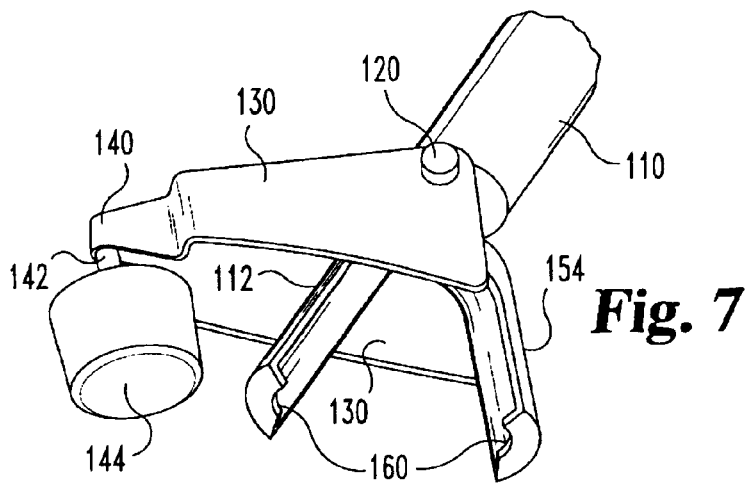
FIG. 7 is a perspective view of a simplified grasping tip design for the clamping jaws.

The clamping jaws have been described in one embodiment as having grooved surfaces 114a and 114b on the inside mating faces to facilitate gripping the valve body. It should be understood, however, that it is contemplated as within the scope of the invention that the clamping surfaces 114a and 114b may have any suitable surface finish to allow the jaws 112 and 154 to grip the valve stem 200 by any part of the valve body 210 or threaded tip 230. In one preferred embodiment, the clamping surfaces 114a and 114b are a half-cylindrical inner radius with a grooved or knurled surface to facilitate gripping the valve stem. Many different gripping surfaces known to those of skill in the art may be used. For purposes of illustration, another alternative for the grasping ends of the clamping jaws is illustrated in FIG. 7. As illustrated in FIG. 7, the clamping jaws 112 and 154 extend to clips 160 at the grasping ends of the clamping jaws. A valve stem is firmly grasped by compressing the valve stem between the clips 160.

It should be understood that it is contemplated as within the scope of the invention that the shape of the jaws 112 and 154 may be varied. For example, the jaws 112 and 154 may be any generally round cross section to include polygonal and oval shapes. Similarly, the external dimension of the closed jaws 112 and 154 might also be tapered from a first external dimension near the pivot point 120 to a smaller second external dimension at the grasping ends to assist in guiding the jaws into a recessed valve opening of a rim.

A means of biasing the clamping jaws 112 and 154 in an open position may also be used. The use of a spring device for this purpose is common in the design of clamping tools and various types of pliers.

The tire valve tool 100 is preferably constructed of a rigid and high strength material, examples of which include various metals such as steel and metal alloys as well as high strength polymers and composite materials.

While the invention has been illustrated and described in detail in the drawings and the above description, the same is to be considered as illustrative and not restrictive in character, it being understood that only the preferred embodiment has been illustrated and described and that all changes and modifications that come within the spirit of the invention are desired to be protected. In reading the claims it is intended that when words such as "a", "an", "at least one", "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A tire valve stem tool for tubeless tire rims, comprising:
   a. an elongated handle extending between a proximal end and a distal end;
   b. a means for grasping a valve stem, the grasping means being attached to the distal end of the handle; and
   c. a lever arm extending between an attached end and a fulcrum end, the attached end being attached to the distal end of the handle, wherein the fulcrum end of the an extension means with lever arm has a non-marring contact surface, and wherein the offset height of the non-marring contact surface is adjustable.

2. A tire valve stem tool for tubeless tire rims as described in claim 1, wherein the offset height is between zero to four inches.

3. A tire valve stem tool for tubeless tire rims, comprising:
   a. an elongated handle extending between a proximal end and a distal end;
   b. a first clamping jaw member extending between a first clamping jaw attached end and a first clamping jaw grasping end, wherein the first clamping jaw attached end is fixedly attached to the distal end of the handle and extends substantially lineally from the distal end of the handle;
   c. a second clamping jaw member extending between a second clamping jaw attached end and a second clamping jaw grasping end, wherein the second clamping jaw attached end is pivotally attached to the distal end of the handle at a pivot point substantially adjacent the first clamping jaw member and wherein the second clamping jaw member pivots between a closed position and an open position in relation to the first clamping jaw member; and
   d. a lever arm fixedly attached to the second clamping jaw member and at a substantially normal angle to the second clamping jaw member, the lever arm having a fulcrum end extending beyond the pivot point past the first clamping jaw member.

4. A tire valve stem tool for tubeless tire rims as described in claim 3, wherein the fulcrum end of the lever arm has a non-marring contact surface.

5. A tire valve stem tool for tubeless tire rims as described in claim 4, wherein the contact surface is made of a polymer material.

6. A tire valve stem tool for tubeless tire rims as described in claim 4, wherein the offset height of the non-marring contact surface is adjustable.

7. A tire valve stem tool for tubeless tire rims as described in claim 6, wherein the offset height is between zero to four inches.

8. A tire valve stem tool for tubeless tire rims as described in claim 3, wherein the first and second clamping jaw members are tapered from a first external dimension near the pivot point to a smaller second external dimension at the grasping ends.

9. A tire valve stem tool for tubeless tire rims as described in claim 3, wherein each of the first and second clamping jaw members has a grooved inner radius.

10. A tire valve stem tool for tubeless tire rims as described in claim 3, further comprising a means for biasing the clamping jaw members in an open position.

11. A tire valve stem tool for tubeless tire rims, comprising:
    a. an elongated handle extending between a proximal end and a distal end;
    b. a first clamping jaw member extending between a first clamping jaw attached end and a first clamping jaw grasping end, wherein the first clamping jaw attached end is fixedly attached and extends substantially lineally from the distal end of the handle;
    c. a second clamping jaw member extending between a second clamping jaw attached end and a second clamping jaw grasping end, wherein the second clamping jaw attached end is pivotally attached to the distal end of the handle at a pivot point substantially adjacent the first clamping jaw member, and wherein the second clamping jaw member pivots between a closed position and an open position in relation to the first clamping jaw member;
    d. a lever arm extending between a lever arm attached end and a fulcrum end, wherein the length of the lever arm is between substantially one inch and substantially six inches, wherein the lever arm attached end is fixedly attached and at a substantially normal angle to the second clamping jaw member and the lever arm fulcrum end extends beyond the pivot point past the first clamping jaw member, and wherein the fulcrum end has a bottom side, wherein the bottom side is in the direction of the first and second clamping jaw members; and
    e. a contact surface attached to the bottom side of the fulcrum end, wherein the contact surface is made of a polymer material.

12. A tire valve stem tool for tubeless tire rims as described in claim 11, wherein the contact surface has an offset height that is between zero and four inches.

13. A tire valve stem tool for tubeless tire rims as described in claim 11, wherein the first clamping jaw member has a grooved inner radius and wherein the second clamping jaw member has a grooved inner radius.

14. A tire valve stem tool for tubeless tire rims as described in claim 13, wherein the contact surface has an offset height that is between zero and four inches.

* * * * *